United States Patent [19]

Nezu

[11] 4,400,085
[45] Aug. 23, 1983

[54] SHEET SUPPLYING APPARATUS

[75] Inventor: Takao Nezu, Hamura, Japan

[73] Assignee: Konishiroku Photo Industry Co., Ltd., Tokyo, Japan

[21] Appl. No.: 417,694

[22] Filed: Sep. 13, 1982

Related U.S. Application Data

[63] Continuation of Ser. No. 209,999, Nov. 24, 1980, abandoned.

[30] Foreign Application Priority Data

Nov. 27, 1979 [JP] Japan .................................. 54-153381
Nov. 27, 1979 [JP] Japan .................................. 54-153383

[51] Int. Cl.³ ...................... G03B 27/62; G03B 27/64
[52] U.S. Cl. .................................... 355/76; 271/261
[58] Field of Search ................... 355/75, 76; 271/261

[56] References Cited

U.S. PATENT DOCUMENTS

| | | | |
|---|---|---|---|
| 3,936,041 | 2/1976 | Shiina et al. | 355/75 |
| 3,979,115 | 9/1976 | Bruckner et al. | 271/261 |
| 4,146,326 | 3/1979 | Taylor et al. | 355/75 |

OTHER PUBLICATIONS

IBM Technical Disclosure Bulletin, vol. 22, No. 4, Sep., 1979, pp. 1366–1367.

Primary Examiner—Monroe H. Hayes
Attorney, Agent, or Firm—James E. Nilles

[57] ABSTRACT

A sheet supplying apparatus comprising: a pair of supply rollers adapted to be moved into pressure contact with each other to take a sheet into the gap therebetween; a retractable gate member disposed at the inner side of said supply rollers and adapted to retain the leading end of the sheet after the latter is taken into the gap between the supply rollers; and a plurality of detectors disposed between the gate member and the supply rollers. The detectors are arrayed along a line perpendicular to the direction of supply of the sheet to detect the leading end of the sheet. When the leading end of the sheet is detected by all of the detectors, a signal is generated to move the supply rollers into pressure contact while retracting the gate member and, thereafter, to start the rotation of the supply rollers. The time length between the detection of the sheet and the commencement of the supply is shorter for the supply of the second and subsequent sheets than for the first sheet.

5 Claims, 6 Drawing Figures

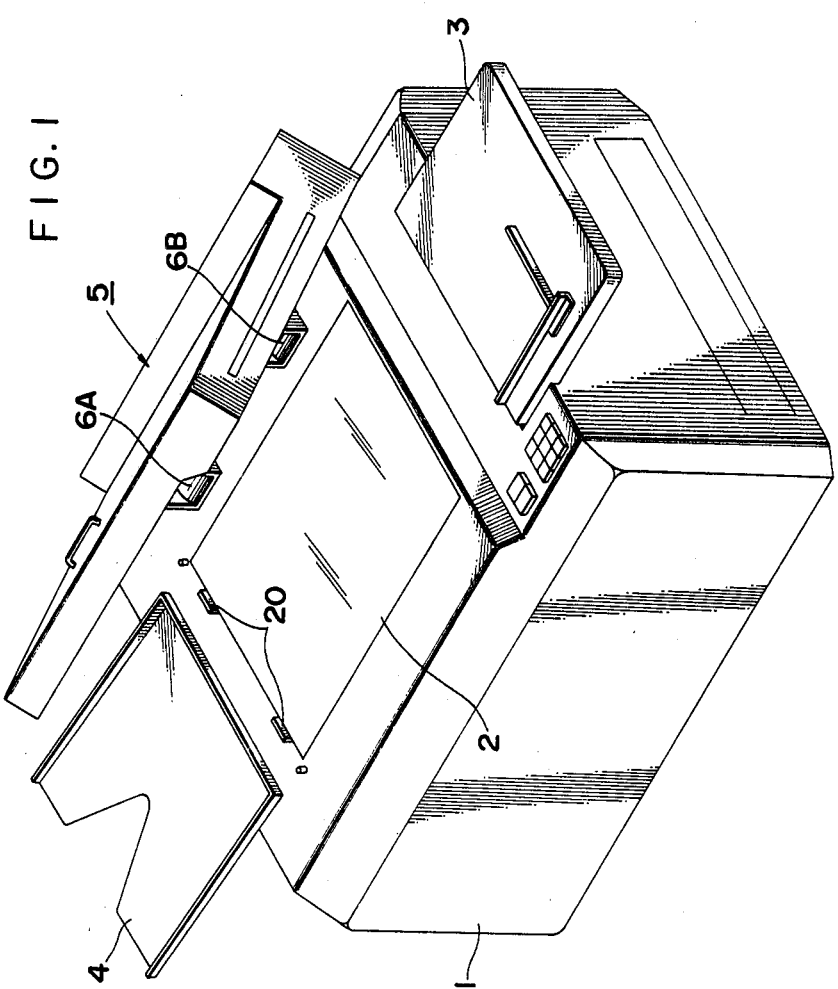

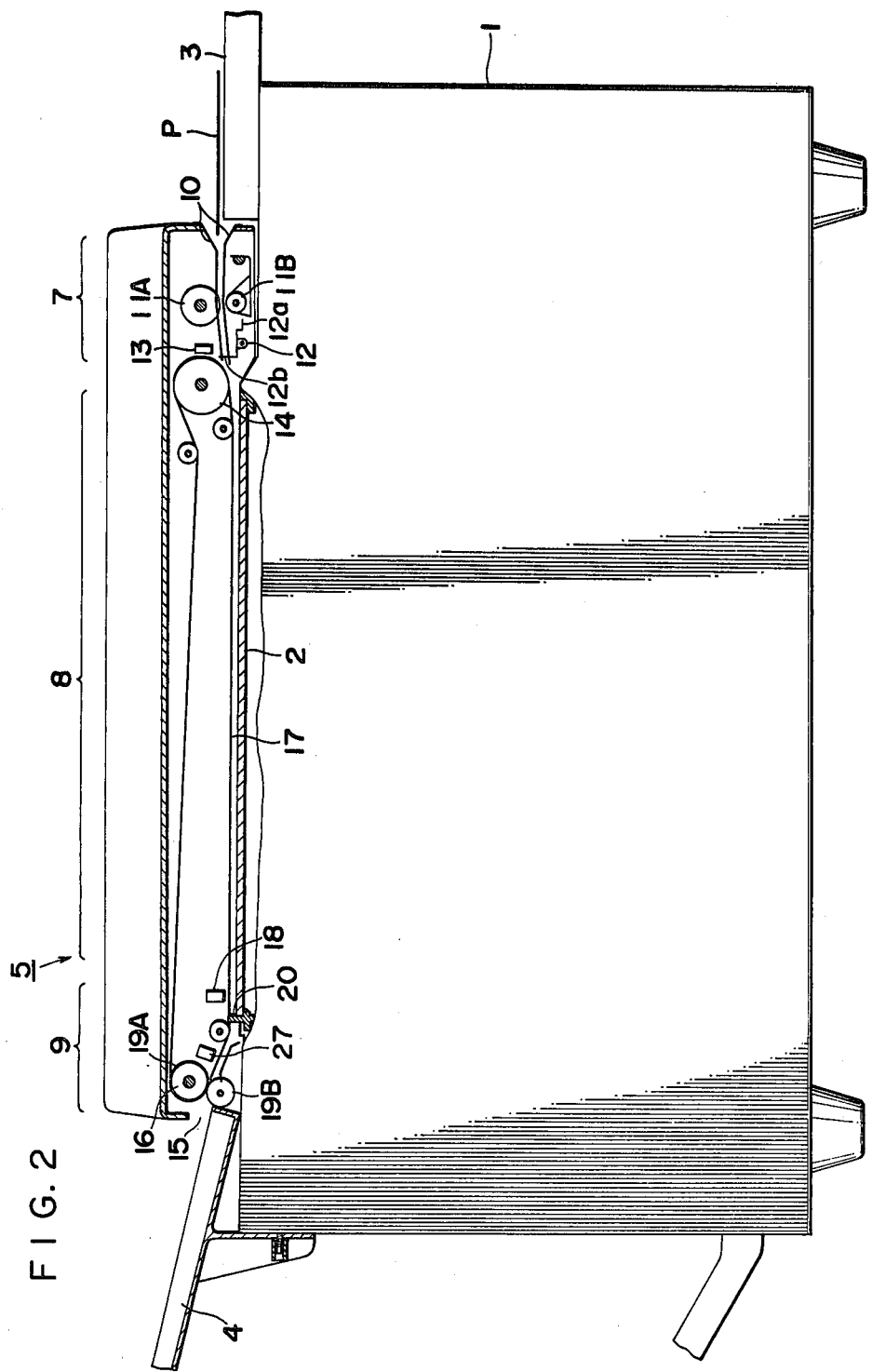

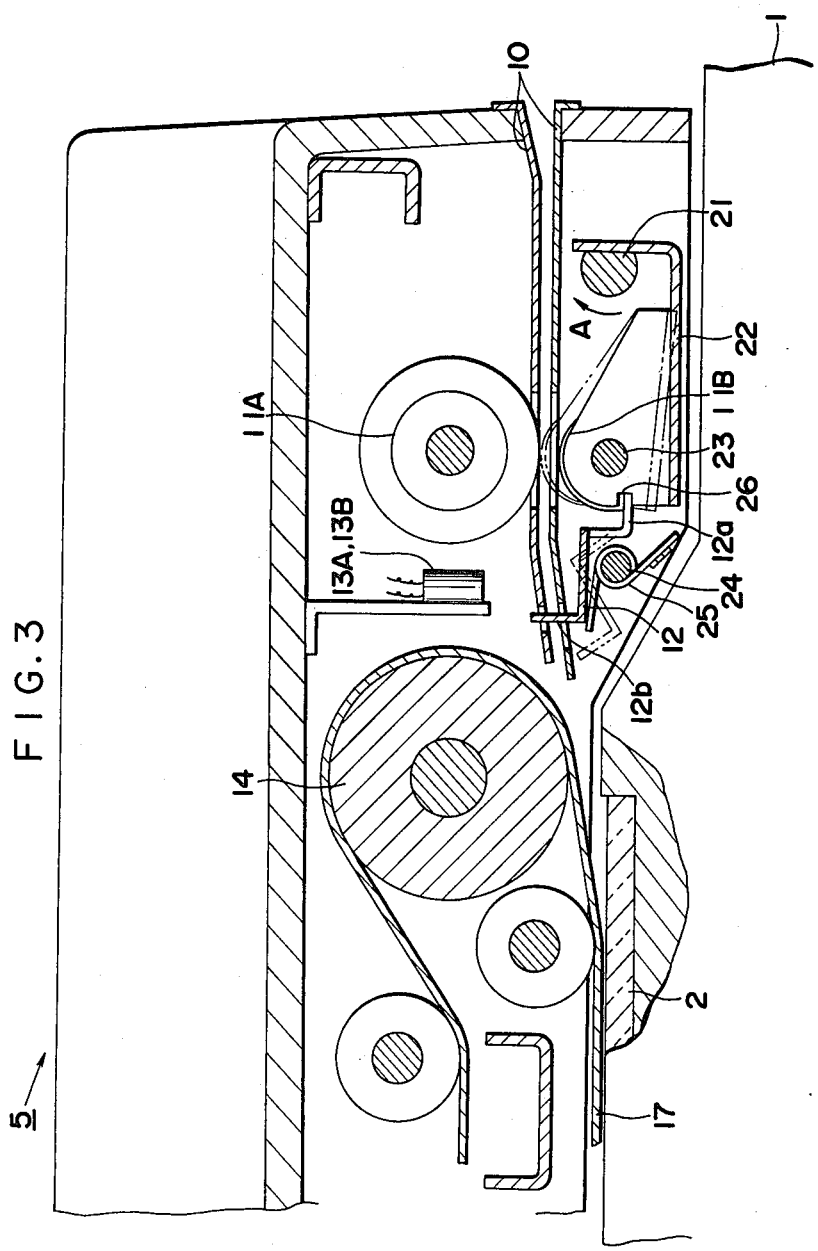

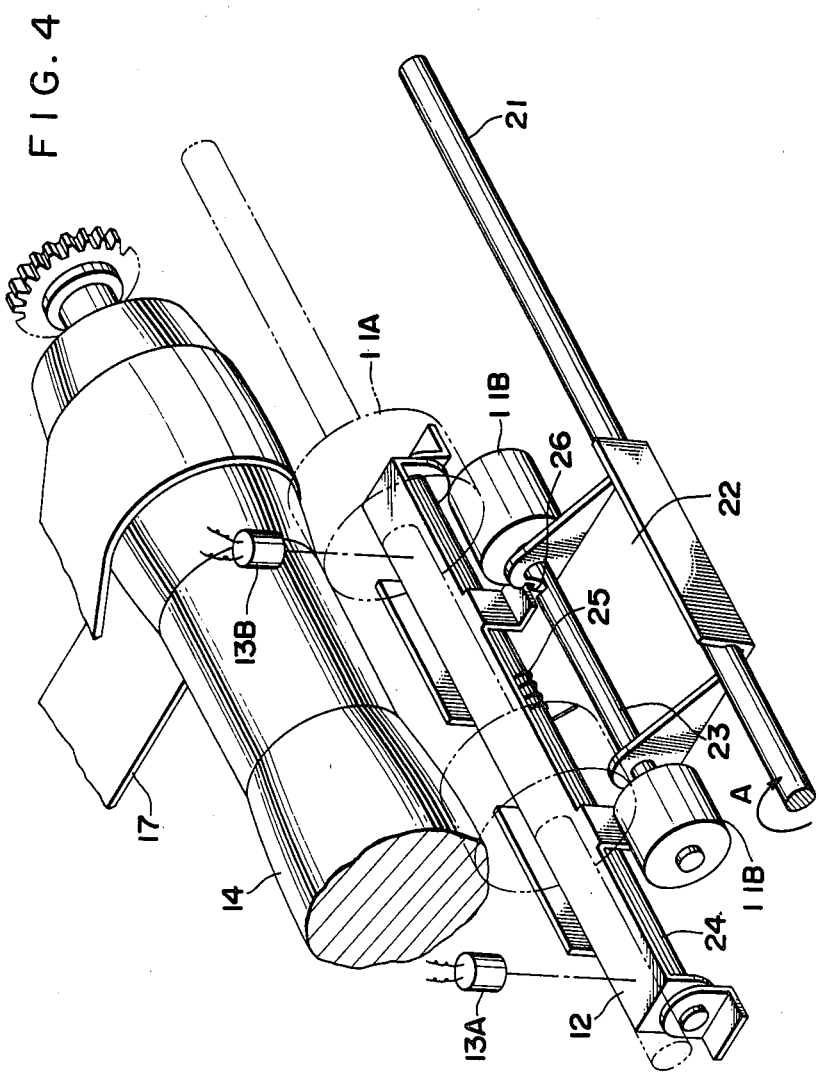

SHEET SUPPLYING APPARATUS

REFERENCE TO RELATED CO-PENDING APPLICATION

This application is a continuation application from application Ser. No. 209,999, filed Nov. 24, 1980, now abandoned and entitled: SHEET SUPPLYING APPARATUS.

BACKGROUND OF THE INVENTION

1. Field of the Invention:

The present invention relates to a device for supplying sheets or originals to, for example, the copy board of a copying machine or the like, while manually or automatically orientating the sheets or originals in a specific direction and, more particularly, to a sheet supplying device of the type adapted to detect and receive the sheets or originals one by one.

2. Description of the Prior Art:

Hitherto, such a sheet supplying device has been known in which the originals inserted into the original carrier is picked up one by one and manually delivered to the copy board. In this known device, the feed of the original is commenced upon detect of the originals received by the original receiver by means of a detector. In the conventional device, more specifically, the feed is commenced immediately after the detection of the original or the feed is commenced after lapse of a predetermined time from the detection. These two systems have advantages and disadvantages. Namely, in the former system, the feed of the original is commenced immediately after the insertion of the original to the supplying device so that the copying time is somewhat shortened. On the other hand, various problems such as feed of the original in the wrong posture and so forth are caused, particularly when the original is fed manually, because the feed is started directly after the detection. In the latter system, there is a sufficient time for correcting the orientation of the original, so that the above-mentioned problem is avoided even when the original is the first one and the exposure is made only once. However, the copying time is impractically long due to the time lag between the insertion of the originals and the commencement of the feed.

In the sheet supplying device of the kind described, it is essential that the original or the sheet is supplied to the exposure section at a specific orientation. To this end, in the conventional device, a rule or a paper feed guide, which provides a reference for the orientation of the originals, is mounted on the original receiver and, at the same time, a detector is disposed immediately upstream from a stopper member for retaining the leading end of the original. The feed of the original is commenced after the detection of the leading end of the original by the detector.

In these known device, the orientation of the original is determined manually, with a reference to the rule provided on the original feeder, so that the original is fed at a wrong orientation to cause a wrong orientation of the copy on the copying paper. The feed of the original in the wrong posture often causes a jamming of the original in the copying machine resulting, in the worst case, cutting of the original.

SUMMARY OF THE INVENTION

Under these circumstances, the present invention aims as its major object to provide a sheet supplying device which can reduce the chance of feed of original in the wrong orientation and can shorten the copying time.

Other objects and features of the invention will become clear from the following description of the preferred embodiment taken in conjunction with the accompanying drawings.

BRIEF DESCRIPTION OF THE DRAWINGS

FIG. 1 is a perspective view of the whole part of a copying machine in accordance with the invention;

FIG. 2 is a front elevational view of the copying machine with a part thereof being removed;

FIG. 3 is an enlarged sectional view of the copying machine;

FIG. 4 is an enlarged perspective view of a document feeding device of the copying machine as shown in FIG. 3;

DESCRIPTION OF THE PREFERRED EMBODIMENT

Figure 6:
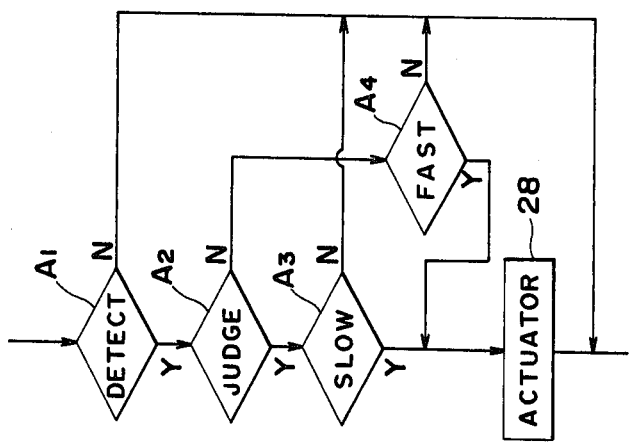
FIG. 6 is a flow chart of the control of the original feed.

The embodiment which will be hereinafter described and shown in the attached drawings is a document feeding device of a copying machine. This, however, is not exclusive and the sheet supplying device of the invention finds various other uses such as printing machine, facsimile transmitter and so forth which require the supply of sheets in correct orientation.

Before turning to the detailed description of the invention, a description will be described with specific reference to FIGS. 1 and 2 as to an automatic document feeding apparatus incorporating the document feeding device of the invention.

Referring to these Figures, a copying machine generally designated with the reference numeral 1 is provided at its top portion with a copy board glass 2 on which the original is placed for the exposure and copying. An original receiver 3 and a discharged original tray 4 are attached to the left and right sides at the top portion of the copying machine 1, so as to oppose each other across the copy board glass 2. Therefore, the originals received by the original receiver 3 are taken one by one onto the copy board glass 2 by an automatic document feeding apparatus 5 which will be mentioned later, and are successively discharged to the discharged original tray 4 by the same apparatus 5.

The automatic document feeding apparatus 5 is disposed on the copying machine 1 in such a manner as to overlie and cover the copy board glass 2. The automatic document feeding apparatus 5 is adapted to be opened in a transverse direction in view of the transporting direction of the original to be copied and stopped at any open angle by means of a pair of support means 6A, 6B which are mounted at the rear side of the upper face of the copying machine 1. As will be seen from FIG. 2, the automatic document feeding apparatus 5 is provided with a supply section 7, transfer section 8 and an ejection section 9 which are arranged in series in the mentioned order. The supply section 7 has supply rollers 11A, 11B attached to a guide plate 10, as well as a gate member 12 provided with an original retaining portion 12b. The movement of the supply rollers 11A, 11B into and out of pressure contact with each other, rotation of these rollers and the retracting movement of the gate member 12, are made in accordance with a detection signal delivered by a first detector 13 adapted to detect the leading end of the original P.

The transfer section 8 includes a drive roller or pulley 14 positioned adjacent to the intake guide plate 10, a driven roller or pulley 16 disposed at a discharge port 15 and a transfer belt 17 stretched between these pulleys 14, 16. The transfer belt 17 has a white transferring side. The drive pulley 14 is controlled to be stopped when the leading end of the original P is detected by a second detector 18 on the copy board glass 2 and is started again in accordance with an exposure completion signal from the copying machine. At the same time, the discharge section 9 comprises a discharge roller 19A coaxial with the aforementioned idle roller 16, and a discharge roller 19B which makes rolling contact with the roller 19A. The arrangement is such that the original P after the exposure is discharged to the discharged original tray 4 by the rotation of the discharge rollers 19A, 19B. A reference numeral 20 in FIGS. 1 and 2 designate a stopper for locating the leading end of the original P at the exposure section.

FIGS. 3 and 4 show the details of the construction of supply section 7. More specifically, referring to FIGS. 3 and 4, the supply roller 11B is rotatably secured to a shaft 23 of an end of a supporting bracket 22 which is fixed at its base portion to an operation shaft 21 which is adapted to be rotated in the direction of arrow A by a solenoid which is not shown. The aforementioned gate member 12 is supported by the automatic document feeding apparatus 5 in such a manner as to be able to swing around a horizontal shaft 24, and is biased to project to the inside of the intake guide plate 10 by means of a spring 25 wound round the horizontal shaft 24. The aforementioned gate member 12 is provided with a connecting tab 12a bent therefrom and projecting into a groove 26 of the supporting bracket 22.

The detector 13 described in connection with FIGS. 1 and 2 can be embodied as a plurality of photoelectric elements 13A, 13B disposed between the supply rollers 11A, 11B and the gate member 12. More specifically, two photoelectric elements 13A, 13B, which may be replaced with microswitches, are arranged along a line which extends at a right angle to the direction of supply of the original, at the position where the leading end of the original P is retained by the retaining tab 12b. A solenoid is energized when the leading end of the original P is detected by both of the photoelectric elements 13A, 13B, and, thereafter, the signal for causing the rotation of the driving side supply roller 11A is generated.

The automatic document feeding apparatus having the described construction operates in a manner explained hereinbelow. If the original P on the original receiver 3 is correctly inserted to permit the photoelectric elements 13A, 13B simultaneously detect the leading end of the original P retained by the original retaining tab 12b, a signal is produced for energizing the solenoid, so that the operation shaft 21 is rotated in the direction of the arrow A to press the supply rollers 11A, 11B into pressure contact with each other. In this state, it is not possible to extract the original. At the same time, the gate member 12 is retracted out of the intake guide plate 10 to release the original from the retaining tab 12b to permit the original to be fed or supplied. Thereafter, the driving torque is delivered to the supply roller 11A so that the original P is supplied onto the copy board glass 2 at a right posture, i.e. at the correct orientation.

Figure 5:
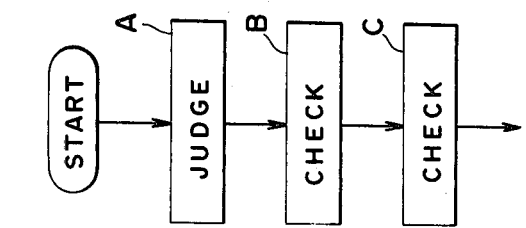
FIG. 5 is a flow chart of the operation of the document feeding device.

FIG. 5 illustrates a general flow of essential parts when the original supply system of the invention is conducted under the control of a microcomputer. Needless to say, the illustrated arrangement is replaced by an equivalent control circuit, if the control is made in a hard-ware manner without employing the microcomputer.

Referring to FIG. 5, in the step A, judgements are made as to whether there is no jamming, whether the original is placed on the copy board glass and whether the exposure is finished to permit the supply of the original. In the step B, it is checked whether the original has reached the detector 18. The transfer belt is stopped as the original is detected by the detector 18. Also, in the step C, a jam check is made by the detector 27 associated with the discharge rollers 19A, 19B. As the original is safely detected by the detector 27, a signal is generated to inform that the copying machine is ready for receiving the next original.

FIG. 6 illustrates the control flow of the step A. More specifically, the step A includes a first step $A_1$ in which the original is detected by the detector 13, and the step $A_2$ in which a judgement is made as to whether there is any preceding original on the copy board glass 2, i.e. whether the original to be supplied is the first one. In case that the original to be supplied is the first one, a timer having a slow operation, e.g. operation time of 0.5 sec., is set and, as this timer operates (Step $A_3$) an actuator 28 for actuating the aforementioned supply rollers 11A, 11B and the transfer belt 17 is started. In the event that there is any preceding original, another timer having a fast operation, e.g. 2.2 sec., is set and the aforementioned actuator 28 is started by this timer at step $A_4$. The operation of the actuator 28 is not caused in both cases where the original is not detected by the detector and where neither timer operates.

As will be understood from the foregoing description, according to the sheet supplying apparatus of the invention, the supply of the original is not commenced when the original is inserted in a wrong orientation due to, for example, rough handling, so that the jamming and mis-copy attributable to the wrong orientation of the original are avoided. In addition, the unintentional movement of the original by a finger touch or the like after the insertion of the original is eliminated because the supply rollers firmly grip the sheet immediately after the detection of the original inserted in the correct orientation.

In the event that the original is the first one, a sufficient time is preserved for correcting the orientation of the original. For the insertion of the second and subsequent originals, the operator usually is trained in the insertion work so that the time required for the correction of the orientation is shortened. In addition, in case of the second and subsequent originals, there is a sufficient time for the operator to insert the original to the supplying section, because of the presence of the exposure time for the preceding original, particularly when a plurality of copies are to be obtained from a single original. It is, therefore, possible to supply the originals in the correct orientation and the overall copying time is shortened conveniently.

According to the invention, the copying operation is made at a high reliability because the copying at wrong orientation and the jamming, which are attributable to the original supply in wrong orientation, are fairly avoided and, at the same time, unintentional movement of the original to wrong orientation by a finger touch or the like, which may occur accidentally, is completely eliminated.

What is claimed is:

1. A sheet supplying apparatus comprising: a pair of supply rollers adapted to be moved into pressure contact with each other to take a sheet into the gap therebetween; a retractable gate member disposed at the inner side of the supply rollers and adapted to retain the leading end of the sheet after the latter is taken into the gap between the supply rollers; a plurality of detectors disposed between the gate member and the supply rollers, said detectors being arrayed along a line perpendicular to the direction of supply of the sheet to detect the leading end of the sheet; and control means responsive to the detectors for operating the gate member and the supply rollers so that when the leading end of the sheet is detected by all of the detectors, the control means effects movement of the supply rollers into pressure contact while retracting the gate, the control means including time delay means to start the rotation of the supply rollers so that there is commencement of supply after such movement of the rollers and retraction of the gate and to cause the time length between the detection of the sheet and the commencement of the supply to be shorter for the supply of a second and subsequent sheets than for a first sheet.

2. A sheet supplying apparatus comprising: a pair of supply rollers adapted to be moved into pressure contact with each other to take a sheet into the gap therebetween; a retractable gate member disposed at the inner side of the supply rollers and adapted to retain the leading end of the sheet after the latter is taken into the gap between the supply rollers; first means operable to cause movement of the supply rollers into pressure contact and to cause retraction of the gate member out of the path of movement of the sheet; second means operable to cause rotation of said supply rollers; a plurality of detectors disposed between the gate member and the supply rollers, said detectors being arrayed along a line perpendicular to the direction of supply of the sheet to detect the leading end of the sheet; and control means, including time delay means, responsive to the detectors to operate the first means and the second means for operating the gate member and the supply rollers so that when the leading end of the sheet is detected by all of the detectors, the control means effects movement of the supply rollers into pressure contact while retracting the gate, the control means including time delay means to operate the second means to start the rotation of the supply rollers so that there is commencement of supply after such movement of the rollers and retraction of the gate and to cause the time length between the detection of the sheet and the commencement of the supply to be shorter for the supply of a second and subsequent sheets than for a first sheet.

3. Apparatus according to claim 2 further including another detector cooperable with the plurality of detectors to indicate the presence of more than one sheet.

4. A copy machine comprising:
a copy board glass at a top position of said machine;
an automatic document feeding apparatus; and
support means for mounting said automatic document feeding apparatus on said copy machine and enabling said apparatus to be moved between one position wherein it overlies and covers said copy board glass and an open position;
said automatic document feeding apparatus comprising:
a supply section for receiving an original document;
a transfer section which is adjacent said copy board glass when said automatic document feeding apparatus is in closed position for transferring said document thereacross;
and an ejection section for ejecting said document;
said transfer section including a detector responsive to the presence of a document therebeneath;
said supply section comprising:
a pair of spaced-apart intake guide plates for receiving said document therebetween;
a pair of supply rollers movable relative to each other between an open position and a closed position to grip said document therebetween;
roller drive means operable to cause rotation of at least one of said pair of drive rollers;
a supporting bracket on which a supply roller is rotatably mounted, said supporting bracket being movable between roller-open and roller-closed positions;
a retractable gate member mounted between said pair of supply rollers and said transfer section of said automatic document feeding apparatus and movable between one position wherein it engages the leading edge of said document when the latter is inserted between said pair of supply rollers when the latter are in the open position and a retracted position out of the path of said document;
biasing means for biasing said gate member into releasable latched engagement with said supporting bracket when the latter is in roller-open position whereby said gate member is held in said one position;
a rotatable operation shaft engaged with said supporting bracket;
shaft drive means operable to rotate said operation shaft to thereby move said supporting bracket between roller-open and roller-closed positions and thereby effect corresponding movement of said gate member between said one position and said retracted position, respectively;
a plurality of detectors mounted between said gate member and said pair of supply rollers and arrayed along a line perpendicular to the direction in which said document is supplied for detecting the leading edge of said document;
a control means, including time delay means, responsive to said plurality of detectors when all of the latter simultaneously detect the leading edge of said document to operate said shaft drive means to cause said pair of supply rollers to move to closed position whereby said document is gripped therebetween and to unlatch said gate member and allow it to be biased into retracted position; and after a time interval to operate said roller drive means to cause rotation of said rollers and commencement of supply of said document from said supply section to said transfer section;
said control means being further responsive to said detector in said transfer section and to said plurality of detectors sensing when second and subsequent sheets are present in said machine to decrease the length of time between detection of the leading edge of said document by said plurality of detectors and operation of said roller drive means.

5. A copy machine comprising:

a copy board glass at a top position of said machine;
an original document receiver tray on said copying machine near one end of said copy board glass;
a discharged original document tray on said copying machine near the opposite end of said copy board glass;
an automatic document feeding apparatus; and
support means for mounting said automatic document feeding apparatus on said copying machine and enabling said apparatus to be moved between one position wherein it overlies and covers said copy board glass and an open position;
said automatic document feeding apparatus comprising:
a supply section which is adjacent said receiver tray when said apparatus is in closed position and for receiving an original document fed therefrom;
a transfer section which is adjacent said copy board glass when said automatic document feeding apparatus is in closed position for transferring said document thereacross;
and an ejection section which is adjacent said discharged original document tray when said apparatus is in closed position for ejecting said document into said latter tray;
said transfer section including a detector responsive to the presence of a document therebeneath;
said supply section comprising:
a pair of spaced-apart intake guide plates stationarily mounted on said apparatus and adapted to receive said document therebetween;
a pair of supply rollers mounted on said apparatus and movable relative to each other between an open position and a closed position to grip said document therebetween;
roller drive means on said apparatus and operable to cause rotation of at least one of said pair of drive rollers;
a supporting bracket pivotably mounted on said apparatus and on which one of said pair of supply rollers is rotatably mounted; said supporting bracket being movable between roller-open and roller-closed positions;
a retractable gate member mounted on said apparatus between said pair of supply rollers and said transfer section and movable between one position wherein it engages the leading edge of said document when the latter is inserted between said pair of supply rollers when the latter are in the open position and a retracted position out of the path of said document;
biasing means on said apparatus for biasing said gate member into releasable latched engagement with said supporting bracket when the latter is in roller-open position whereby said gate member is held in said one position;
a rotatable operation shaft mounted on said apparatus and engaged with said supporting bracket;
shaft drive means operable to rotate said operation shaft to thereby move said supporting bracket between roller-open and roller-closed positions and thereby effect corresponding movement of said gate member between said one position and said retracted position, repsectively;
a plurality of detectors mounted on said apparatus between said gate member and said pair of supply rollers and arrayed along a line perpendicular to the direction in which said document is supplied for detecting the leading edge of said document;
and control means, including time delay means, responsive to said plurality of detectors when all of the latter simultaneously detect the leading edge of said document to operate said shaft drive means to cause said pair of supply rollers to move to closed position whereby said document is gripped therebetween and to unlatch said gate member and allow it to be biased into retracted position; and after a time interval to operate said roller drive means to cause rotation of said rollers and commencement of supply of said document from said supply section to said transfer section;
said control means being further responsive to said detector in said transfer section and to said plurality of detectors sensing when second and subsequent sheets are present in said machine to decrease the length of time between detection of the leading edge of said document by said plurality of detectors and operation of said roller drive means.

* * * * *